(12) United States Patent
Blankenship et al.

(10) Patent No.: US 7,449,440 B2
(45) Date of Patent: Nov. 11, 2008

(54) NONIONIC ASSOCIATIVE THICKENER CONTAINING VINYL ADDITION POLYMER BACKBONE

(75) Inventors: Robert Mitchell Blankenship, Harleysville, PA (US); Barrett Richard Bobsein, Sellersville, PA (US); Lifeng Zhang, Chalfont, PA (US)

(73) Assignee: Rohm and Haas Company, Philadelphia, PA (US)

( * ) Notice: Subject to any disclaimer, the term of this patent is extended or adjusted under 35 U.S.C. 154(b) by 505 days.

(21) Appl. No.: 11/077,685

(22) Filed: Mar. 11, 2005

(65) Prior Publication Data

US 2006/0205630 A1    Sep. 14, 2006

(51) Int. Cl.
*C11D 3/37* (2006.01)
*C08G 67/00* (2006.01)
(52) U.S. Cl. .................. 510/475; 510/419; 510/421; 510/505; 528/392; 524/804; 106/31.13; 106/31.58
(58) Field of Classification Search ................. 510/419, 510/421, 475, 505, 506; 528/392; 524/804; 106/31.13, 31.58
See application file for complete search history.

(56) References Cited

U.S. PATENT DOCUMENTS 4,246,387 A  * 1/1981  Deutsch ...................... 526/209
4,722,962 A  * 2/1988  Shay et al. .................. 524/548

FOREIGN PATENT DOCUMENTS

DE    102004061242   8/2005
EP    0250943        1/1988

OTHER PUBLICATIONS

Jannasch, "Synthesis of Novel Aggregating Comb-Shaped Polyethers for Use as Polymer Electrolytes", Macromolecules, vol. 33, pp. 8604-8610, 2000, no month given.*
Jannasch, "Phase Behavior and ion conductivity of electrolytes based on aggregating combshaped polyethers", Electrochimica ACTA, vol. 46, pp. 1641-1649, Mar. 15, 2001.*
Jannasch P.: "Synthesis of Novel Aggregating Comb-Shaped Polyethers for Use as Polymer Electrolytes" Macromolecules, vol. 33, 2000, pp. 8604-8610, XP002414846, no month given.
Jannasch P.: "Phase Behavior and Ion Conductivity of Electrolytes Based on Aggregating Combshaped Polyethers" Electrochimica ACTA, Elsevier Science Publishers, Barking, GB, vol. 46, No. 10-11, Mar. 15, 2001, pp. 1641-1649, XP004231577.

* cited by examiner

*Primary Examiner*—Brian P Mruk
(74) *Attorney, Agent, or Firm*—Cantor Colburn

(57) ABSTRACT

Nonionic associative thickeners are provided having a nonionic water soluble polymer backbone containing vinyl addition polymer. The nonionic water soluble polymer backbone has at least two pendant polymeric chains attached to the nonionic water soluble polymer backbone. The pendant polymeric chains have terminal chain segments containing polyoxypropylene units. The nonionic associative thickeners are useful for modifying the rheology of compositions including aqueous compositions, such as latex containing compositions.

10 Claims, No Drawings

NONIONIC ASSOCIATIVE THICKENER CONTAINING VINYL ADDITION POLYMER BACKBONE

This invention generally relates to a nonionic associative thickener. In particular, the present invention relates to a nonionic associative thickener having a nonionic water soluble polymer backbone containing a vinyl addition polymer. The nonionic water soluble polymer backbone has at least two pendant polymeric chains attached thereto. The pendant polymeric chains have terminal chain segments. The nonionic associative thickener is useful for modifying the rheology of various compositions, including water based latex compositions, such as paints, adhesives, and paper coating compositions.

In the formulation of aqueous latex paints, a desired balance between high and low shear viscosities is sought to provide satisfactory applications properties, such as by spraying or brushing; satisfactory leveling of the applied wet paint film; and minimal sagging of the applied wet paint film. Aqueous latex paints are commonly formulated with various viscosity modifying additives, often referred to as flow modifiers, viscosity modifiers, rheology modifiers, or thickeners, to balance the high and low shear flow properties of the aqueous latex paint. Examples of viscosity modifying additives include cellulosic materials such as hydroxyethyl cellulose; alkali soluble emulsions; associative thickeners; and ionic polymers. Typically, blends of viscosity modifying additives are employed to obtain the appropriate balance of high and low shear viscosities.

Associative thickeners are water-soluble or water-swellable polymers that have chemically attached hydrophobic groups. The associative thickeners operate to thicken systems to which they are added by non-specific associations, such as adsorption on surfaces or aggregation in solution akin to micellization, between the hydrophobic groups on the thickener molecules and moieties on the other components in the system, similar to the non-specific associations of conventional surfactants.

One problem in aqueous latex paints containing associative thickeners is a decrease in the paint viscosity with increasing temperature. As these paints are formulated to a desired viscosity for application at a typical temperature range, such as, for example, a temperature range of 15-30° C., this decreased viscosity at higher temperatures leads to diminished application properties, such as increased dripping and sagging of the applied paint. Further, higher temperatures are often encountered during the storage or shipping of the paint. This may lead to increased settling of the dispersed inorganic pigment or inorganic fillers as a result of increased sedimentation of the pigment or filler particles in a paint having lower viscosity.

U.S. Pat. No. 4,722,962 discloses nonionic associative thickeners containing as polymerized units, water-soluble or partially water soluble monoethylenically unsaturated monomer or mixtures thereof, and nonionic urethane monomer. The nonionic urethane monomer is a urethane reaction product of a monohydric nonionic surfactant with a monoethylenically unsaturated monoisocyanate. The reference discloses select monohydric nonionic surfactants that include a polyethoxylate chain and optionally polypropoxylate groups, provided that the number of ethoxylate groups exceeds the number of optional propoxylate groups. Aqueous solutions containing the disclosed nonionic associative thickeners were reported to show little change in viscosity with variations in pH and salt concentration.

Desired are associative thickeners with thickening efficiencies that do not decrease with increased temperature, such as a change in temperature from 25° C. to a temperature in the range of 40-50° C.

This invention, among other things, is a nonionic associative thickener comprising a vinyl addition polymer; and at least two pendant polymeric chains attached to the nonionic water soluble polymer backbone; wherein each of the pendant polymeric chains comprise a terminal chain segment selected from:

$$D\text{-}(L)_n\text{-}(PO)_x\text{-}(L)_n\text{-}(EO)_y\text{-}, \quad \text{i)}$$

$$D\text{-}(L)_n\text{-}(EO)_q\text{-}(L)_n\text{-}(PO)_x\text{-}(L)_n\text{-}, \text{ or} \quad \text{ii)}$$

$$D\text{-}(L)_n\text{-}co[(PO)_w(EO)_z]\text{-}(PO)\text{-}(L)_n\text{-} \quad \text{iii)}$$

where: D is a hydrophobe comprising from 1 to about 24 carbon atoms; L is a linker group; EO is an oxyethylene unit; PO is an oxypropylene unit; $co[(PO)_w(EO)_z]$ is a copolymer comprising the PO and the EO; each n is independently selected from zero or 1; q is an integer in the range of from 1 to about 30, w is an integer in the range of from 3 to about 150; x is an integer in the range of from 4 to about 150; y is an integer in the range of from zero to less than x; z is an integer in the range of from 1 to w; q is less than x; and wherein the nonionic associative thickener has a weight average molecular weight of at least 10,000.

Provided is a composition comprising: I) a nonionic associative thickener comprising: a nonionic water soluble polymer backbone comprising a vinyl addition polymer; and at least two pendant polymeric chains attached to the nonionic water soluble polymer backbone; wherein each of the pendant polymeric chains comprise a terminal chain segment selected from:

$$D\text{-}(L)_n\text{-}(PO)_x\text{-}(L)_n\text{-}(EO)_y\text{-} \quad \text{i)}$$

$$D\text{-}(L)_n\text{-}(EO)_q\text{-}(L)_n\text{-}(PO)_x\text{-}(L)_n\text{- or} \quad \text{ii)}$$

$$D\text{-}(L)_n\text{-}co[(PO)_w(EO)_z]\text{-}(PO)\text{-}(L)_n\text{-} \quad \text{iii)}$$

where: D is a hydrophobe comprising from 1 to about 24 carbon atoms; L is a linker group; EO is an oxyethylene unit; PO is an oxypropylene unit; $co[(PO)_w(EO)_z]$ is a copolymer comprising the PO and the EO; each n is independently selected from zero or 1; q is an integer in the range of from 1 to about 30; w is an integer in the range of from 3 to about 150; x is an integer in the range of from 4 to about 150; y is an integer in the range of from zero to less than x; z is an integer in the range of from 1 to w; q is less than x; and wherein the nonionic associative thickener has a weight average molecular weight of at least 10,000; and II) at least one material selected from extender, pigment, or colorant.

Also provided is a method of thickening a composition comprising the step of: adding a nonionic associative thickener to the composition, wherein the nonionic associative thickener comprises:

a) a nonionic water soluble polymer backbone comprises a vinyl addition polymer; and
b) at least two pendant polymeric chains attached to the nonionic water soluble polymer backbone;

wherein each of the pendant polymeric chains comprise a terminal chain segment selected from:

$$D\text{-}(L)_n\text{-}(PO)_x\text{-}(L)_n\text{-}(EO)_y\text{-}, \quad \text{i)}$$

$$D\text{-}(L)_n\text{-}(EO)_q\text{-}(L)_n\text{-}(PO)_x\text{-}(L)_n\text{-}, \text{ or} \quad \text{ii)}$$

$$D\text{-}(L)_n\text{-}co[(PO)_w(EO)_z]\text{-}(PO)\text{-}(L)_n\text{-} \quad \text{iii)}$$

where: D is a hydrophobe comprising from 1 to about 24 carbon atoms; L is a linker group; EO is an oxyethylene unit; PO is an oxypropylene unit; co[(PO)$_w$(EO)$_z$] is a copolymer comprising the PO and the EO; each n is independently selected from zero or 1; q is an integer in the range of from 1 to about 30; w is an integer in the range of from 3 to about 150; x is an integer in the range of from 4 to about 150; y is an integer in the range of from zero to less than x; z is an integer in the range of from 1 to w; q is less than x; and wherein the nonionic associative thickener has a weight average molecular weight of at least 10,000.

As used herein, "KU" refers to Krebs unit and is a measure of the mid-shear viscosity as measured by a Kreb-Stormer viscometer.

As used herein, "viscosity stability" refers to the ability of a liquid containing composition, such as an aqueous composition, to resist change in viscosity as measured by KU upon the addition of surfactant or a composition containing surfactant, such as a colorant. Colorants are added to paints in units of milliliter of colorant per liter of paint (referred to as ml/l) or in units of ounces of colorant per gallon of paint (referred to as "oz/gal"). A preferred viscosity stabilizer for latex paints must provide KU viscosity changes of less than about 10 KU upon the addition of up to 94 ml/l (12 oz/gal) of colorant. A more preferred viscosity stabilizer for latex paint must provide KU viscosity changes of less than about 5 units upon the addition of up to 94 ml/l of colorant.

As used herein, the use of the term "(meth)" followed by another term such as acrylate refers to both acrylates and methacrylates. For example, the term "(meth)acrylate" refers to either acrylate of methacrylate; the term "(meth)acrylic" refers to either acrylic or methacrylic; and the term "(meth) acrylamide" refers to either acrylamide or methacrylamide.

As used herein, the term "aqueous composition" refers to a composition that is provided predominantly in water rather than organic solvent. It is contemplated, however, that a minor amount of organic solvent may be included in the composition and that the composition will nonetheless meet the definition of "aqueous composition".

As used herein, the term "oxyalkylene" refers to units having the structure:

—(O—R)—, where R is an alkylene group. Examples of oxyalkylenes include, but are not limited to:
  oxyethylene with the structure —(OCH$_2$CH$_2$)—; and
  oxypropylene with the structure —(OCH(CH$_3$)CH$_2$)—

Polymers containing these units are referred to as "polyoxyalkylenes". Examples of homopolymers of polyoxyalkylenes include, but are not limited to:
  polyoxyethylene, which contains units of oxyethylene; and
  polyoxypropylene, which contains units of oxypropylene.

Alternatively, the polyoxyalkylenes may be copolymers containing two or more different oxyalkylene units. The different oxyalkylene units may be arranged randomly to form a random polyoxyalkylene polymer; or may be arranged in blocks to form a block polyoxyalkylene polymer. Block polyoxyalkylene polymers have two or more neighboring polymer blocks, wherein a polymer block contains at least two of the same oxyalkylene units, and a neighboring block contains different oxyalkylene units.

Vinyl addition polymer are polymers formed by the addition polymerization of ethylenically unsaturated monomers, such as 1,2-vinyl polymers, dienes, and (meth)acrylates. In vinyl addition polymerization, the ethylenic unsaturation of a monomer unit is reacted to add that monomer unit to the growing polymer. Vinyl addition polymers include, for example, poly(meth)acrylates, polyvinyl chloride, polyvinyl acetate, polyethylene, polypropylene, and polystyrene.

Condensation polymers are polymers formed from the reaction of monomers containing one or more functional groups, wherein at least one of the reacted functional groups is not an ethylenic unsaturation. The reaction may occur between monomers having the same functional group, such as an epoxy group; or between monomers having different functional groups, such as between a monomer having a hydroxy group and another monomer having an isocyanate group. Preferably, the condensation polymer is formed from the reaction of monomers containing one or more functional groups, wherein the functional groups are not ethylenic unsaturations. The reaction of the one or more functional groups results in the formation of a linkage group, such as, for example, a urethane group. Examples of suitable functional groups include, but are not limited to isocyanates, hydroxy groups, amine groups, epoxy groups, acid groups such as carboxylic acid groups, and halogen groups such as chloride groups. Linkage groups formed by the reaction of the one or more functional groups include, but are not limited to ethers, urethanes, amides, esters, ureas, and carbonates. Examples of condensation polymers include, but are not limited to, polyurethanes, polyureas, polyesters, polyethers, aminoplast-ether polymers, and polycarbonates. As used herein, the term "condensation polymer" expressly excludes vinyl addition polymers.

The nonionic associative thickener of the present invention has a nonionic water soluble polymer backbone that contains a vinyl addition polymer. The water soluble polymer backbone has at least two pendant polymeric chains attached thereto. Each of the pendant polymeric chains have a terminal chain segment that is terminated by a hydrophobe group.

The nonionic water soluble polymer backbone is formed by the polymerization of ethylenically unsaturated monomer units. Suitable configurations for the nonionic water soluble polymer backbone include linear, branched, star-shaped, comb-shaped, and complex shapes such as a crosslinked polymer. The nonionic water soluble polymer backbone has an aqueous solubility of at least 1% by weight at a temperature of 25° C. The solubility of the nonionic water soluble polymer backbone is determined without the attached pendant polymeric chains. Further, the nonionic water soluble polymer is substantially free of ionic groups. As used herein, "substantially free of ionic groups" means less than 5 equivalent % ionic groups, preferably less than 2 equivalent % ionic groups, and more preferably, less than 1 equivalent % ionic groups, based on equivalents of monomers used to prepare the nonionic water soluble polymer. Ionic groups are groups capable of ionizing in water at a pH in the range of from 2 to 12. Typically, the nonionic water soluble polymer backbone has a weight average molecular weight of at least 10,000, preferably at least 20,000, and more preferably, at least 30,000. Suitable ranges for the weight average molecular weight of the nonionic water soluble polymer backbone include 10,000 to 500,000, preferably about 20,000 to 200,000, and more preferably 30,000 to 100,000. All values of the weight average molecular weight (referred to herein as "$M_w$") used herein are determined by size exclusion chromatography (referred to herein as "SEC") as described herein below.

The nonionic associative thickener has at least two pendant polymeric chains attached to the nonionic water soluble polymer backbone. Each of the pendant polymeric chains is attached as a sidechain to the nonionic water soluble polymer backbone, or as an endgroup at a terminal position of the nonionic water soluble polymer backbone. The pendant polymeric chains are attached by linkage groups to the nonionic water soluble polymer backbone. Each of the pendant polymeric chains also have a terminal chain segment, which is the nonattached end of the pendant polymeric chain. The pendant polymeric chains may be linear or branched. A linear pendant polymeric chain has one terminal chain segment. A branched pendant polymeric chain has one or more terminal chain segments, and optionally, other terminal groups that are not the terminal chain segments.

The terminal chain segment of the pendant polymeric chain has an polyoxyalkylene segment attached by a linkage to a hydrophobe group. The polyoxyalkylene segment includes a polypropylene chain or a copolymer containing oxypropylene units. The hydrophobe group contains 1 to about 24 carbon atoms. Suitable hydrophobe groups include $C_1$ to $C_{24}$ alkyl groups, $C_1$ to $C_{24}$ alkylaryl groups, $C_4$ to $C_{24}$ alkenyl groups, and $C_8$ to $C_{24}$ polyunsaturated groups. The hydrophobe groups may be linear, branched, or cyclic. Further, the hydrophobe groups may be substituted. Examples of suitable alkyl groups include, but are not limited to, methyl, ethyl, propyl, butyl, hexyl, octyl, decyl, undecyl, dodecyl, tridecyl, 2-butyl-1-octyl, and stearyl. Examples of suitable alkylaryl groups include, but are not limited to, alkylphenol, nonylphenol, and acetylphenol. In one non-limiting embodiment, the hydrophobe group is selected from $C_1$ to $C_{18}$ alkyl groups. In a different non-limiting embodiment, the hydrophobe group is selected from $C_8$ to $C_{18}$ alkyl groups.

The weight average molecular weight of the nonionic associative thickeners are typically in the range of from 10,000 to 500,000, preferably in the range of from 20,000 to 200,000, and more preferably in the range of from 30,000 to 100,000.

The nonionic associative thickeners of the present invention have a nonionic vinyl addition polymer backbone and two or more attached pendant polymeric chains, wherein each of the pendant polymeric chains have a terminal chain segment selected from A.1, A.2, or A.3.

$$D\text{-}(L)_n\text{-}(PO)_x\text{-}(L)_n\text{-}(EO)_y\text{-} \qquad A.1$$

wherein:
D is a hydrophobe containing from 1 to about 24 carbon atoms, preferably from 1 to about 18 carbon atoms, and more preferably from about 6 to about 18 carbon atoms;
L is a linker group;
EO is an oxyethylene unit;
PO is an oxypropylene unit;
each n is independently selected from zero or 1;
x is an integer in the range of from 4 to about 150, preferably in the range of from about 10 to about 100, and more preferably in the range of from about 15 to about 50; and
y is an integer in the range of from zero to less than x.

$$D\text{-}(L)_n\text{-}(EO)_q\text{-}(L)_n\text{-}(PO)_x\text{-}(L)_n\text{-} \qquad A.2$$

wherein:
D is a hydrophobe containing from 1 to about 24 carbon atoms, preferably from 1 to about 18 carbon atoms, and more preferably from about 6 to about 18 carbon atoms;
L is a linker group;
EO is an oxyethylene unit;
PO is an oxypropylene unit;
each n is independently selected from zero or 1;
x is an integer in the range of from 4 to about 150, preferably in the range of from about 10 to about 100, and more preferably in the range of from about 15 to about 50;
q is an integer in the range of from 1 to about 30, preferably in the range of from 1 to about 20, and more preferably in the range of from 1 to about 10; and
q is less than x.

$$D\text{-}(L)_n\text{-}co[(PO)_w(EO)_z]\text{-}(PO)\text{-}(L)_n\text{-} \qquad A.3$$

wherein:
D is a hydrophobe containing from 1 to about 24 carbon atoms, preferably from 1 to about 18 carbon atoms, and more preferably from about 6 to about 18 carbon atoms;
L is a linker group;
EO is an oxyethylene unit;
PO is an oxypropylene unit;
$co[(PO)_w(EO)_z]$ is a copolymer containing units of PO and EO;
each n is independently selected from zero or 1;
w is an integer in the range of from 3 to about 150; preferably in the range of from about 10 to about 100, and more preferably in the range of from about 15 to about 50; and
z is an integer in the range of from 1 to w.

In the structures represented in A.1-3, the value of n equal to zero indicates that an oxygen atom forms the linkage. For example, in the terminal chain segment having the composition $C_8H_{17}O(C_3H_6O)_{40}(C_2H_6O)_{20}C_2H_6O$—, an oxygen atom forms an ether linkage between the hydrophobe (D) and the polyoxypropylene chain $(PO)_{40}$. Further, an ether linkage is also formed by an oxygen atom connecting the polyoxypropylene chain to the polyoxyethylene chain. The value of n equal to one indicates that linkage group containing heteroatoms, such as a urethane or urea linkage. For example, in the terminal chain segment having the composition, $C_8H_{17}NHC(O)O(C_3H_6O)_{39}C_3H_6OC(O)NHC_6H_{12}NHC(O)O(C_2H_4O)_7C_2H_4OC(O)NH$—, urethane linkages connect the hydrophobe to the polyoxypropylene chain; the polyoxypropylene chain to the polyoxyethylene chain, and the polyoxyethylene chain to the polymer backbone.

The nonionic associative thickeners have nonionic water soluble polymer backbones that are vinyl addition polymers. These polymer backbones may be linear or branched. Examples of suitable vinyl addition polymers for providing the polymer backbone include, but are not limited to, poly(meth)acrylates, poly(meth)acrylamides, polyvinyl alcohol, and polyvinyl acetate copolymers.

The nonionic associative thickeners may be prepared by the addition polymerization of at least one nonionic vinyl water soluble monomer, at least one nonionic vinyl surfactant monomer, and optionally, at least one second vinyl monomer.

The nonionic vinyl water soluble monomer is a vinyl monomer that has a water solubility a temperature of 25° C. of at least 200 millimoles/liter. Examples of suitable nonionic vinyl water soluble monomers include hydroxyalkyl (meth) acrylates such as 2-hydroxyethyl (meth)acrylate; 3-hydroxypropyl (meth)acrylate; 4-hydroxybutyl (meth)acrylate; (meth)acrylamide; and (meth)acrylates containing poly(oxyethylene) chains such as poly(oxyethylene) (meth)acrylate, poly(oxyethylene) methyl ether (meth)acrylate, and poly (oxyethylene) ethyl ether (meth)acrylate. Preferred (meth) acrylates containing poly(oxyethylene) chains have 2 to 50 oxyethylene units. The second vinyl monomer is a vinyl monomer with a water solubility of less than 200 millimoles/liter. Also, the second vinyl monomer expressly excludes the nonionic vinyl surfactant monomer. Examples of suitable second vinyl monomers include styrene and $C_{12}$ to $C_{24}$ esters of (meth)acrylic acid.

The nonionic vinyl surfactant monomer is a vinyl monomer having an ethylenically unsaturated group, such as, for example, a (meth)acrylic, a vinyl, a maleate, a styryl, or an α-methyl styryl group; and one or more attached nonionic surfactant moieties. The nonionic surfactant moiety contains oxypropylene units and at least one hydrophobe having from 1 to about 24 carbon atoms. The nonionic surfactant moiety is attached to the ethylenically unsaturated group through a linkage, such as an ester, ether, urethane, or amide linkage.

Examples of nonionic surfactant monomers include $C_1$ to $C_{24}$ alkylphenoxy (oxypropylene)$_{4-50}$ (meth)acrylates and maleates, and $C_1$ to $C_{24}$ alkoxy (oxypropylene)$_{4-50}$ (meth)acrylates and maleates; ethers such as allyl ethers of $C_1$ to $C_{24}$ alkylphenoxy (oxypropylene)$_{4-50}$ alcohols; and urethanes such as reaction products of α,α-dimethyl-m-isopropenyl benzyl isocyanate with either $C_1$ to $C_{24}$ alkylphenoxy (oxypropylene)$_{4-50}$ alcohol or $C_1$ to $C_{24}$ alkyl (oxypropylene)$_{4-50}$ alcohol. Other suitable nonionic vinyl surfactant monomers include monomers with the structures

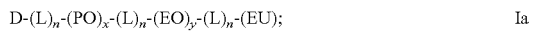  (Ia)

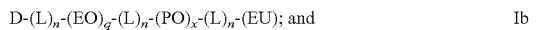  (Ib)

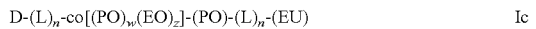  (Ic)

wherein D is a hydrophobe containing from 1 to about 24 carbon atoms; L is a linker group; EO is an oxyethylene unit; PO is an oxypropylene unit; EU is an ethylenically unsaturated group; each n is independently selected from zero or 1; q is an integer in the range of from 1 to about 30; x is an integer in the range of from 4 to about 150; y is an integer in the range of from zero to less than x; w is an integer in the range of from 3 to about 150; and z is an integer in the range of from 1 to w; and q is less than x. Examples of suitable linker groups include urethanes, ethers, ureas, and esters.

The nonionic associative thickeners are prepared by vinyl addition polymerization. Suitable polymerization techniques include aqueous solution polymerization, solution polymerization in an organic solvent, emulsion polymerization, inverse polymerization, and suspension polymerization. The polymerization process typically employs initiators, chain transfer agents, buffers, or other synthesis adjuvants, as is known in the art.

Alternatively, the nonionic associative thickeners may be prepared by attaching reactive surfactants onto a vinyl addition polymer backbone that has suitable complementary functional groups, such as alcohol groups, isocyanate groups, or amine groups.

Reactive surfactants include groups having the formulas IIa, IIb, or IIc.

  (IIa)

wherein D is a hydrophobe containing from 1 to about 24 carbon atoms; L is a linker group; RG is a reactive group; EO is an oxyethylene unit; PO is an oxypropylene unit; n is independently selected from zero or 1; and x is an integer in the range of from 4 to about 150, preferably in the range of from 15 to 30; y is an integer in the range of from zero to less than x.

  (IIb)

wherein D is a hydrophobe containing from 1 to about 24 carbon atoms; L is a linker group; RG is a reactive group; EO is an oxyethylene unit; PO is an oxypropylene unit; each n is independently selected from zero or 1; x is an integer in the range of from 4 to about 150, preferably in the range of from about 15 to about 30; q is an integer in the range of from 1 to about 30, and q is less than x.

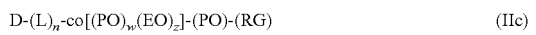  (IIc)

wherein D is a hydrophobe containing from 1 to about 24 carbon atoms; L is a linker group; RG is a reactive group; EO is an oxyethylene unit; PO is an oxypropylene unit; co[(PO)$_w$(EO)$_z$] is a copolymer containing the PO and the EO; n is independently selected from zero or 1; w is an integer in the range of from 3 to about 150, preferably in the range of from 15 to 30; z is an integer in the range of from 1 to w.

Suitable reactive groups, RG, for reacting with an isocyanate group, include hydroxyl groups or amine groups. Suitable reactive groups, RG, for reacting with an alcohol group, include isocyanate groups, or epoxide groups.

Preferably, the hydrophobe group, D, contains from 3 to 16 carbon atoms. More preferably, the hydrophobe group, D, is an alkyl group. Examples of suitable hydrophobe groups include butyl, hexyl, octyl, decyl, undecyl, lauryl, stearyl, tri-decyl, and 2-butyl-1-octyl.

Examples of suitable reactive surfactants include reactive surfactants having hydroxyl groups such as polypropylene glycol monoalkyl ethers such as R-(PO)$_x$-OH wherein PO represents an oxypropylene unit, R is an alkyl group such as butyl or lauryl, and x is in the range of from about 10 to about 30.

The pendant polymeric chains are provided by attaching reactive surfactants to the polymer backbone. The reactive surfactants have a polyoxyalkylene chain with a hydrophobe at one terminus of the polyoxyalkylene chain and a reactive group at the second terminus of the polyoxyalkylene chain. The reactive surfactants are represented by Formulas IIa, IIb, and IIc hereinabove.

The nonionic associative thickener typically contains as polymerized units, from about 0.1 to about 20 weight %, preferably from about 0.5 to about 10 weight %, and more preferably from about 1 to about 6 weight % of the nonionic vinyl surfactant monomer, based on the weight of the nonionic associative thickener. The nonionic associative thickener may also contain from about 80 to about 99.9 weight %, preferably from about 50 to about 99.5 weight %, and more preferably from about 84 to about 99 weight % of the nonionic water soluble monomer, based on the weight of the nonionic associative thickener. Optionally, the nonionic associative thickener may contain from 1 to about 30 weight %, preferably from zero to about 20 weight %, and from zero to about 10 weight % of the second vinyl monomer, based on the weight of the nonionic associative thickener.

The nonionic associative thickener of this invention may be provided as an aqueous thickener composition containing the nonionic associative thickener and an aqueous medium. The aqueous thickener composition may contain the nonionic associative thickener at an amount in the range of from about 0.1 to about 40 weight %, preferably in the range of from about 5 to about 30 weight %, and more preferably in the range of from about 10 to about 20 weight %, based on the weight of the aqueous thickener composition. The aqueous medium is predominately water, and optionally contains water miscible solvents, such as ethanol, propanol, and glycol ethers. Preferably the aqueous thickener composition is provided with less than about 5 weight % water miscible solvent, more preferably less than about 2 weight % water miscible solvent, and most preferably, less than about 1 weight % water miscible solvent, based on the weight of the aqueous thickener composition. Most preferred is the aqueous thickener composition that does not contain water miscible solvent. Further, the aqueous thickener composition may be provided substantially free of surfactant. As used herein, "substantially free of surfactant" refers to a composition containing less than about 5 weight %, preferably less than about 1 weight %, and more preferably less than about 0.3 weight % surfactant, based on the weight of the composition. The aqueous thickener composition that is substantially free of surfactant includes surfactant in the range of from zero to about 5 weight %, preferably in the range of from zero to about 1 weight %, and more preferably in the range of from zero to about 0.3 weight %. For example, the aqueous thickener composition may be provided containing from about 10 to about 20 weight % nonionic associative thickener, less than about 0.3 weight % surfactant, and from about 79.7 to about 90 weight % water.

The aqueous thickener composition optionally contains at least one macromolecular organic compound having a hydrophobic cavity. The macromolecular organic compound having a hydrophobic cavity may be added to suppress the viscosity of the aqueous thickener composition, or to provide the aqueous thickener composition with a higher solids level of nonionic associative thickener than in the absence of the macromolecular organic compound having a hydrophobic cavity. Suitable macromolecular organic compounds having a hydrophobic cavity include cyclodextrin, cyclodextrin derivatives, cycloinulohexose, cycloinuloheptose, cycloinulocotose, calyxarene, and cavitand. Cyclodextrin includes α-cyclodextrin, β-cyclodextrin, and γ-cyclodextrin. Cyclodextrin derivatives refers to α-cyclodextrins, β-cyclodextrins, and γ-cyclodextrins in which at least one hydroxyl group located on the rim of the cyclodextrin ring have been functionalized with a substituent group such as methyl, acetyl, hydroxypropyl, and hydroxyethyl groups. Cyclodextrin derivatives also include cyclodextrin molecules with multiple substituent groups including cyclodextrin molecules with more than one type of substituent group. Cyclodextrin derivatives do not include polymers with more than one attached cyclodextrin ring. Preferred cyclodextrin derivatives are methyl-β-cyclodextrin and hydroxypropyl-β-cyclodextrin. Methyl-β-cyclodextrin is the most preferred cyclodextrin derivative. The amount of macromolecular organic compound having a hydrophobic cavity included in the aqueous thickener composition may be in the range of from about 0.1 to about 50 weight %, preferably about 0.1 to about 30 weight %, and more preferably about 0.5 to about 10 weight %, based on the total weight of the aqueous thickener composition.

In one non-limiting embodiment, the aqueous thickener composition is provided as an aqueous dispersion, wherein the nonionic associative thickener is partially or completely solubilized in water, or alternatively, the nonionic associative thickener is dispersed in water as discrete particles of the nonionic associative thickener. This aqueous dispersion is typically characterized by a hazy, white appearance, for example, when prepared at about 1 weight % nonionic associative thickener solids, based on the weight of the aqueous dispersion. Preferably, this aqueous dispersion is substantially free of surfactant. For example, the aqueous dispersion of this non-limiting embodiment may be provided containing from about 10 to about 20 weight % of the nonionic associative thickener, less than about 0.3 weight % surfactant, and from about 79.7 to about 90 weight % water, based on the weight of the aqueous dispersion.

The nonionic associative thickener may be incorporated into compositions, including aqueous compositions or non-aqueous compositions, in amounts ranging from about 0.005 weight % to about 20 weight %, preferably from about 0.01 weight % to about 10 weight %, and most preferably from about 0.05 weight % to about 5 weight %, based on the weight of the composition. Optionally, the composition contains other ingredients, such as pigments; extenders; colorants; surfactants; salts; buffers; pH adjustment agents such as bases and acids; biocides; mildewcide; wetting agents; defoamers; dispersants; pigments; dyes; water miscible organic solvents; anti-freeze agents; corrosion inhibitors; adhesion promoters; waxes; and crosslinking agents. In one non-limiting embodiment, a composition is provided that contains the nonionic associative thickener and at least one material selected from pigment, extender, or colorant.

Examples of suitable pigments include zinc oxide, antimony oxide, zirconium oxide, chromium oxide, iron oxide, lead oxide, zinc sulfide, lithopone, and titanium dioxide such as, for example, anatase and rutile titanium dioxide.

Examples of suitable extenders calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, and talc.

Suitable colorant include inorganic colorant particles and organic colorant particles. Suitable inorganic colorant particles include, but are not limited to, iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; blue iron pigments; carbon black; and metal effect pigments such as aluminum, copper, copper oxide, bronze, stainless steel, nickel, zinc, and brass. One group of preferred inorganic colorant particles is selected from bismuth pigments; mixed metal oxide pigments; chromate and molybdate pigments; ultramarine pigments; cobalt oxide pigments; nickel antimony titanates; lead chrome; blue iron pigments; carbon black; and metal effect pigments.

Suitable organic colorant particles include, but are not limited to, azo pigments, monoazo pigments, diazo pigments, azo pigment lakes, β-naphthol pigments, naphthol AS pigments, benzimidazolone pigments, diazo condensation pigment, metal complex pigments, isoindolinone, and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigments.

Examples of suitable organic colorant particles and inorganic colorant particles include: Color Index Pigment Yellow 1, 2, 3, 5, 6, 10, 12, 13, 14, 16, 17, 62, 65, 73, 74, 75, 81, 83, 87, 90, 93, 94, 95, 97, 98, 99, 199, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 155, 165, 166, 167, 168, 169, 170, 171, 172, 173, 174, 175, 176, 177, 179, 180, 181, 182, 183, 184, 185, 187, 188, 190, 192, 193, and 194; Color Index Pigment Orange 1, 2, 5, 6, 13, 15, 16, 17, 17:1, 19, 22, 24, 31, 34, 36, 38, 40, 43, 44, 46, 48, 49, 51, 60, 61, 62, 64, 65, 66, 67, 68, and 69; Color Index Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 49:1, 49:2, 49:3, 50;1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, and 264; Color Index Pigment Violet: 1, 2, 3, 5:1, 13, 19, 23, 25, 27, 29, 31, 32, 37, 39, 42, 44, and 50; Color Index Pigment Blue 1, 2, 9, 10, 14, 15:1, 15:2, 15:3, 15:4, 15:6, 15, 16, 18, 19, 24:1, 25, 56, 60, 61, 62, 63, 64, and 66; Color Index Pigment Green 1, 2, 4, 7, 8, 10, 36, and 45; Color Index Pigment Black 6, 7, 10, 11, and 28; and Color Index Pigment Brown 1, 5, 22, 23, 25, 38, 41, and 42.

Examples of aqueous compositions which may include the nonionic associative thickener of this invention are paints, such as latex paints; coatings; cosmetics, personal care items such as, for example, shampoos, hair conditioners, hand lotions, hand creams, astringents, depilatories, and antiperspirants; sealants; inks such as, for example, digital imaging inks; cements; caulks; drilling fluids such as oil well flooding compositions and drilling muds, including secondary and tertiary drilling muds; salt solutions; anti-icing solutions; fire fighting fluids; topical pharmaceuticals; adhesives including tile adhesives and ceramic adhesives; cleaners; detergents; fabric softeners; pesticidal and agricultural compositions; paper or board coating formulations; textile formulations; and nonwoven formulations. Examples of non-aqueous compositions include alkyd coating compositions or urethane coating compositions.

In one non-limiting embodiment, the aqueous composition is a latex composition. An aqueous latex composition contains polymer particles dispersed in an aqueous medium. Surfactants, such as, for example, nonionic or anionic surfactants are commonly used in the preparation or the stabilization of the aqueous latex composition. Examples of aqueous latex compositions include (meth)acrylic latex compositions, vinyl acetate latex compositions, ethylene-vinyl acetate latex compositions, styrene butadiene latex compositions, vinyl chloride latex compositions, and aqueous polyurethane dispersions. Aqueous latex compositions typically have average polymer particle diameters in the range of from about 20 nanometers to about 1 micron. The level of addition of the nonionic associative thickener is typically dependent upon the desired level of thickening or viscosity for the aqueous composition. Examples of aqueous latex compositions include latex paints, textile formulations, nonwoven formulations, leather coatings; paper or board coating formulations; and adhesives. The nonionic associative thickener of this invention is useful for increasing the viscosity of aqueous dispersions such as aqueous latex compositions.

Mixing techniques may be employed to incorporate the nonionic associative thickener in the composition, including conventional mixing equipment such as, for example, mechanical lab stirrers, high speed dispersers, ball mills, sand mills, pebble mills, and paddle mixers. The nonionic associative thickener may be added to the composition as a solid, such as a powder; or in liquid form, such as a slurry, or a dispersion. Preferably, the liquid form of the nonionic associative thickener is the aqueous thickener composition, which may be added to aqueous compositions. Optionally, surfactant may be added prior to, during, or after the addition of the nonionic associative thickener to the composition.

The present invention provides a method of thickening a composition including the step of adding the nonionic associative thickener to the composition.

The method of the present invention may be employed to provide compositions, such as aqueous compositions, that do not undergo a viscosity decrease with increasing temperature. For example, aqueous compositions, such as aqueous latex paints, may be provided with a desired viscosity at a temperature range of from about 15° C. to about 30° C., and not undergo a decrease in viscosity at a higher temperatures, such as a temperature range of from about 40° C. to about 50° C.

The nonionic associative thickener composition of this invention may be provided as a mixture containing one or more other cothickeners. Alternatively, the nonionic associative thickener and a cothickener may be added individually to a composition in a concurrently or sequentially. Examples of other suitable thickeners include hydrophobically modified alkali swellable emulsions, hydroxyethyl cellulose, alkali swellable emulsion, and other associative thickeners, such as associative thickeners containing only polyoxyethylene sidechains.

In one non-limiting embodiment, the composition contains at least one nonionic associative thickener of this invention and a low molecular weight associative cothickener. The low molecular weight associative cothickener has a weight average molecular weight that is less than or equal to about 0.5 times the weight average molecular weight of the nonionic associative thickener of this invention. In a further non-limiting embodiment, the cothickener is an diphobe, triphobe, or quadraphobe associative thickener, which has two, three, or four pendant hydrophobes, respectively. The pendant hydrophobes are not contained within the polymer backbone. Examples of diphobe associative thickeners include linear polymers, and branched polymers having two hydrophobes and at least one branch without a hydrophobe. Examples of triphobes and quadraphobe associative thickeners include branched, star-shaped, and comb-shaped polymers. The diphobe, triphobe, or quadraphobe associative cothickeners of the present embodiment may contain only polyoxyethylene sidechains.

A common problem in aqueous latex paints containing associative thickeners is a decrease in viscosity when colorants are added, particularly colorants that contain high levels of surfactant. This is especially problematic when the paint is tinted to a deep tone because a high level of surfactant generally accompanies the colorant. Light-tint (pastel) paints typically contain no more than 31 ml/l (4 oz/gal) of colorant. Mid-tone paints typically contain from greater than 31 ml/l (4 oz/gal) to 63 ml/l (8 oz/gal) of colorant. Deep tone paints typically contain 63 ml/l (8 oz/gal) up to 94 ml/l (12 oz/gal) of colorant. Generally, it is possible to formulate a light tint base at a high enough mid-shear viscosity that colorants added to it will not depress the viscosity to an unacceptable degree. Combinations of associative thickeners have been found to be less sensitive to colorant addition than the individual thickeners alone, in some cases. However, neither of these solutions is completely satisfactory because they either require tedious reformulation, added cost, or both, particularly in deep tone paints. Further, as numerous combinations of colorants and colorant addition levels are employed to provide a broad palette of paint colors, the viscosity depressions of the tinted paints may vary considerably, resulting in tinted paints with unsatisfactory application properties, leveling, or sagging. The nonionic associative thickeners of this invention may be employed to thicken aqueous latex compositions, such as aqueous latex paints, and to provide these compositions with improved resistance to the viscosity decrease that occurs with the addition of surfactant containing compositions, such as colorants.

In certain aqueous latex compositions, associative thickeners that have nonionic polymer backbones and oxyalkylene chains formed from only oxyethylene units in the polymer backbones and the sidechains, may cause bridging between latex particles. This phenomenon may lead to flocculation or syneresis of the aqueous latex composition. Syneresis is the separation of water from the aqueous phase containing the latex particles and may be observed by a separate water phase. Generally, syneresis is undesirable in aqueous latex compositions. In one non-limiting embodiment, the nonionic associative thickener of the present invention is employed in an aqueous latex composition to minimize or eliminate syneresis.

A volatile organic compound ("VOC") is defined herein as a carbon containing compound that has a boiling point below 280° C. at atmospheric pressure. Compounds such as water and ammonia are excluded from VOCs. The nonionic associative thickener may be provided as a low VOC composition. As used herein, a low VOC composition contains less than about 5% VOC by weight, preferably less than about 3% VOC by weight, and more preferably, less than about 1.7% VOC by weight, based on the total weight of the low VOC composition. For example, the aqueous thickener composition may be provided as a low VOC composition.

The following examples are presented to illustrate the process and the composition of the invention. These examples are intended to aid those skilled in the art in understanding the present invention. The present invention is, however, in no way limited thereby.

The following abbreviations are used in the examples:

$M_n$ number average molecular weight $M_w$ weight average molecular weight

Determination of Molecular Weights of the Nonionic Associative Thickeners

The weight average molecular weights and the number average molecular weights of the nonionic associative thickeners were determined using size exclusion chromatography. The separations were carried out on a liquid chromatograph, which included an Agilent 1100 Model isocratic pump and an autosampler (Waldbronn, Germany), an Eppendorf CH-430 Model column oven (Madison, Wis.), and Waters 410 Model differential refractometer (Milford, Mass.). The oven and the refractometer were operated at 40° C. System control, data acquisition, and data processing were performed using Caliber® software (Polymer Laboratories, Church Stretton, UK).

Samples were prepared in tetrahydrofuran (THF) at concentrations of 2 milligram/milliliter (mg/ml) and filtered using 0.45 micron filter.

The SEC separations were performed in THF (certified grade) at 1 millilter/minute using a SEC column set having three PLgel columns (300×7.5 mm ID) packed with polystyrene-divinylbenzene gel (pore size marked as 100 Å, $10^3$ Å and $10^4$ Å, particle size 5 microns) purchased from Polymer Laboratories (Church Stretton, UK). The sample size was 100 microliters with concentration C=2 milligram/milliliter. The molar mass characteristics of the analyzed samples were calculated based on polystyrene standards (Polymer Laboratories, Church Stretton, UK).

EXAMPLE 1

Preparation of Nonionic Vinyl Surfactant Monomer

Example 1.1

To a two-liter reactor fitted with a thermometer, a heating mantle, a temperature regulator, an over head stirring motor, a nitrogen sweep and a condenser with a Dean-Stark trap is charged 376.8 g of polypropylene glycol monobutyl ether (molecular weight 1000) and 400 ml of toluene. The reactor contents are heated under nitrogen to reflux and residual water is removed by the water/toluene azeotrope into the Dean Stark trap. The contents of the reactor is cooled to 90° C. and 0.04 g of 2,6-di-tert butyl-p-cresol, 0.4 g dibutyl tin dilaurate, and 80 g of α,α-dimethyl-m-isopropenyl benzyl isocyanate are added in order to the reactor. The contents of the reactor is maintained at 90° C. for 60 minutes and then cooled to room temperature. The toluene is removed by roto-vac to provide the nonionic vinyl surfactant monomer of Example 1.1.

Example 1.2

To a two-liter reactor fitted with a thermometer, heating mantle, temperature regulator, over head stirring motor, nitrogen sweep and condenser with a Dean-Stark trap is charged 588 g of polypropylene glycol tridecyl ether (molecular weight 1590) and 500 ml of toluene. The contents of the reactor is heated under nitrogen to reflux and residual water is removed by the water/toluene azeotrope into the Dean Stark trap. The contents of the reactor is cooled to 90° C. and 0.04 g of 2,6-di-tert butyl-p-cresol, 0.4 g dibutyl tin dilaurate, and 80 g of α,α-dimethyl-m-isopropenyl benzyl isocyanate are charged in order to the reactor. The reaction is maintained at 90° C. for 60 minutes and then cooled to room temperature. The toluene is removed by roto-vac to provide the nonionic vinyl surfactant monomer of Example 1.2.

EXAMPLE 2

Preparation of Nonionic Associative Thickeners

Example 2.1

A five-liter four necked reactor is equipped with a thermometer, a condenser, a mechanical stirrer, and a nitrogen ebullator. The reactor is charged with 614 g of deionized water and 154 g of t-butanol. The contents of the reactor is heated to 80° C. under nitrogen and then 10 weight % of the catalyst solution (0.14 g of ammonium persulfate in 20 g of deionized water) is added to the reactor. Monomer solution 1 (691 g of acrylamide in 1673 g of deionized water and 395 g of t-butanol), monomer solution 2 (38 g of Example 1.1, and 4 g of n-dodecyl mercaptan in 100 g of t-butanol), and initiator solution (1.4 g ammonium persulfate in 118 g of deionized water) are gradually added to the reactor over a period of 2 hours. After the complete addition of the monomer and initiator solutions, the contents of the reactor is maintained at a temperature of 80° C. for 30 minutes. Next, a solution of 0.7 g of ammonium persulfate in 17 g of deionized water is added and the contents of the reactor is maintained at a temperature of 80° C. for 1 hour. The contents of the reactor is allowed to cool to room temperature. The nonionic associative thickener of Example 2.1 has a polyacrylamide backbone with a weight average molecular weight of approximately 40,000, and terminal chain segments having a polyoxypropylene chain length of approximately 17 units attached to a $C_4$ hydrophobe.

Example 2.2

A five-liter four necked reactor is equipped with a thermometer, a condenser, a mechanical stirrer, and a nitrogen ebullator. The reactor is charged with 614 g of deionized water and 154 g of t-butanol. The contents of the reactor is heated to 80° C. under nitrogen and then 10 weight % of the catalyst solution (0.14 g of ammonium persulfate in 20 g of deionized water) is added to the reactor. Monomer solution 1 (691 g of acrylamide in 1673 g of deionized water and 395 g of t-butanol), monomer solution 2 (38 g of Example 1.2 and 4 g of n-dodecyl mercaptan in 100 g of t-butanol), and initiator solution (1.4 g ammonium persulfate in 118 g of deionized water) are gradually added to the reactor over a period of 2 hours, after the complete addition of the monomer and initiator solutions, the contents of the reactor is maintained at a temperature at 80° C. for 30 minutes. Next, a solution of 0.7 g of ammonium persulfate in 17 g of deionized water is added and contents of the reactor is maintained at a temperature of 80° C. for 1 hour. The contents of the reactor is allowed to cool to room temperature. The nonionic associative thickener of Example 2.2 has a polyacrylamide backbone with a weight average molecular weight of approximately 40,000, and terminal chain segments having a polyoxypropylene chain length of approximately 24 units attached to a $C_{13}$ hydrophobe.

Example 2.3

A nonionic associative thickener is prepared according to the general procedure of Example 2.1. The nonionic associative thickener of Example 2.3 has a polyacrylamide backbone, a weight average molecular weight of approximately 30,000, and terminal chain segments having a polyoxypropylene chain length of approximately 10 units attached to a $C_{24}$ hydrophobe.

Example 2.4

A nonionic associative thickener is prepared according to the general procedure of Example 2.1. The nonionic surfactant monomer contains an acrylate monomer having a ester group containing a block copolymer of polyoxyethylene-polyoxypropylene with a butyl endgroup: $CH_2=CH(CO)(EO)_{20}(PO)_{30}OC_4H_9$. The nonionic associative thickener of Example 2.4 has a polyacrylamide backbone, a weight average molecular weight of 35,000, and terminal chain segments having block copolymer chain terminated with a $C_4$ hydrophobe. The block copolymer chain contains 20 units of oxyethylene attached the 30 units of oxypropylene, wherein the hydrophobe is attached to the polyoxypropylene block and the polyoxyethylene is attached to the polymer backbone.

Example 2.5

A nonionic associative thickener is prepared according to the general procedure of Example 2.1, except that monomer emulsion 1 contains hydroxyethyl acrylate in place of acrylamide. The nonionic associative thickener of Example 2.5 has a polyhydroxyethyl acrylate backbone with a weight average molecular weight of approximately 40,000, and terminal chain segments having a polyoxypropylene chain length of approximately 17 units attached to a $C_4$ hydrophobe.

Example 2.6

A nonionic associative thickener is prepared according to the general procedure of Example 2.1, except that monomer emulsion 1 contains equal molar amounts of hydroxyethyl acrylate and acrylamide. The nonionic associative thickener of Example 2.6 has a copolymer backbone containing polymerized hydroxyethyl acrylate and acrylamide and a weight average molecular weight of approximately 40,000. Further, the terminal chain segments of the nonionic associative thickener of Example 2.6 have a polyoxypropylene chain length of approximately 17 units attached to a $C_4$ hydrophobe.

What is claimed is:
1. A nonionic associative thickener comprising:
   a) a nonionic water soluble polymer backbone comprising a vinyl addition polymer; and
   b) at least two pendant polymeric chains attached to said nonionic water soluble polymer backbone;
wherein each of said pendant polymeric chains comprise a terminal chain segment selected from:

$$D\text{-}(L)_n\text{-}(PO)_x\text{-}(L)_1\text{-}(EO)_y\text{-} \qquad \text{i)}$$

or $$D\text{-}(L)_n\text{-}(EO)_q\text{-}(L)_1\text{-}(PO)_x\text{-}(L)_n\text{-} \qquad \text{ii)}$$

where:
   D is a hydrophobe comprising from 1 to about 24 carbon atoms;
   L is a linker group;
   $(L)_1$ is a linker group comprising heteroatoms;
   EO is an oxyethylene unit;
   PO is an oxypropylene unit;
   each n is independently selected from zero or 1;
   q is an integer in the range of from 1 to about 30;
   x is an integer in the range of from 4 to about 150;
   y is an integer in the range of from zero to less than x;
   q is less than x;
and wherein said nonionic associative thickener has a weight average molecular weight of at least 10,000.

2. The nonionic associative thickener according to claim 1 wherein said vinyl addition polymer comprises as polymerized units, at least one nonionic vinyl water soluble monomer selected from the group consisting of hydroxyalkyl (meth)acrylates, (meth)acrylamide, and (meth)acrylates containing poly(oxyethylene) chains.

3. The nonionic associative thickener according to claim 1 wherein
   x is in the range of from about 15 to about 50.

4. The nonionic associative thickener according to claim 1 wherein each of said n has a value of zero.

5. The nonionic associative thickener according to one of claims 1 to 4 wherein said hydrophobe is selected from the group consisting of a $C_1$ to $C_{24}$ alkyl group, a $C_1$ to $C_{24}$ alkylaryl group, a $C_4$ to $C_{24}$ alkenyl group, and a $C_8$ to $C_{24}$ polyunsaturated group.

6. A composition comprising:
   I) a nonionic associative thickener comprising:
      a) a nonionic water soluble polymer backbone comprising a vinyl addition polymer; and
      b) at least two pendant polymeric chains attached to said nonionic water soluble polymer backbone;
   wherein each of said pendant polymeric chains comprise a terminal chain segment selected from:

$$D\text{-}(L)_n\text{-}(PO)_x\text{-}(L)_n\text{-}(EO)_y\text{-} \qquad \text{i)}$$

$$D\text{-}(L)_n\text{-}(EO)_q\text{-}(L)_n\text{-}(PO)_x\text{-}(L)_n\text{-} \qquad \text{ii)}$$

or $$D\text{-}(L)_n\text{-}co[(PO)_w(EO)_z]\text{-}(PO)\text{-}(L)_n\text{-} \qquad \text{iii)}$$

where:
   D is a hydrophobe comprising from 1 to about 24 carbon atoms;
   L is a linker group;
   EO is an oxyethylene unit;
   PO is an oxypropylene unit;
   $co[(PO)_w(EO)_z]$ is a copolymer comprising said PO and said EO;
   each n is independently selected from zero or 1;
   q is an integer in the range of from 1 to about 30;
   w is an integer in the range of from 3 to about 150;
   x is an integer in the range of from 4 to about 150;
   y is an integer in the range of from zero to less than x;
   z is an integer in the range of from 1 to w;
   q is less than x;
   and wherein said nonionic associative thickener has a weight average molecular weight of at least 10,000; and
   II) macromolecular organic compound having a hydrophobic cavity.

7. The composition according to claim 6, wherein the macromolecular organic compound having the hydrophobic cavity comprises cyclodextrin, cyclodextrin derivatives, cycloinulohexose, cycloinuloheptose, cycloinulocotose, calyxarene, or cavitand.

8. The composition according to claim 6, wherein the macromolecular organic compound having the hydrophobic cavity is included in an amount of about 0.1 to about 50 weight %, based on the total weight of the composition.

9. The composition according to claim 6, further comprising at least one material selected from an extender, a pigment, or a colorant.

10. A composition comprising:
I) a nonionic associative thickener comprising:
 a) a nonionic water soluble polymer backbone comprising a vinyl addition polymer; and
 b) at least two pendant polymeric chains attached to said nonionic water soluble polymer backbone;
wherein each of said pendant polymeric chains comprise a terminal chain segment selected from:

$$D\text{-}(L)_n\text{-}(PO)_x\text{-}(L)_1\text{-}(EO)_y\text{-} \qquad \text{i)}$$

or $$D\text{-}(L)_n\text{-}(EO)_q\text{-}(L)_1\text{-}(PO)_x\text{-}(L)_n\text{-} \qquad \text{ii)}$$

where:
 D is a hydrophobe comprising from 1 to about 24 carbon atoms;
 L is a linker group;
 EO is an oxyethylene unit;
 PO is an oxypropylene unit;
 $co[(PO)_w(EO)_z]$ is a copolymer comprising said PO and said EO;
 each n is independently selected from zero or 1;
 q is an integer in the range of from 1 to about 30;
 w is an integer in the range of from 3 to about 150;
 x is an integer in the range of from 4 to about 150;
 y is an integer in the range of from zero to less than x;
 z is an integer in the range of from 1 to w;
 q is less than x;
and wherein said nonionic associative thickener has a weight average molecular weight of at least 10,000; and
II) a diphobe, triphobe, or quadraphobe associative cothickener having a weight average molecular weight that is less than or equal to about 0.5 times said weight average molecular weight of said nonionic associative thickener.

* * * * *